US008959176B2

(12) United States Patent
Dave et al.

(10) Patent No.: US 8,959,176 B2
(45) Date of Patent: Feb. 17, 2015

(54) STREAMING COMMON MEDIA CONTENT TO MULTIPLE DEVICES

(71) Applicant: Apple Inc., Cupertino, CA (US)

(72) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 13/663,606

(22) Filed: Oct. 30, 2012

(65) Prior Publication Data

US 2014/0040497 A1 Feb. 6, 2014

Related U.S. Application Data

(63) Continuation-in-part of application No. 13/563,215, filed on Jul. 13, 2012.

(51) Int. Cl.
*G06F 15/16* (2006.01)
*H04L 12/58* (2006.01)

(52) U.S. Cl.
CPC ............ *H04L 12/5895* (2013.01); *H04L 51/38* (2013.01)
USPC ......................................... 709/217; 709/231

(58) Field of Classification Search
CPC . H04L 12/5895; H04L 51/38; H04L 67/2833; H04L 67/28; H04L 67/325
USPC .................. 709/200–203, 217–227, 230–232
See application file for complete search history.

(56) References Cited

U.S. PATENT DOCUMENTS

| 7,263,293 | B2 | 8/2007 | Ommodt et al. | |
|---|---|---|---|---|
| 7,573,816 | B2 | 8/2009 | Gummalla et al. | |
| 7,894,821 | B2 | 2/2011 | Bai et al. | |
| 8,068,821 | B2 * | 11/2011 | Bhatia et al. | ............... 455/414.1 |
| 8,255,457 | B2 | 8/2012 | Turner et al. | |
| 8,484,203 | B1 | 7/2013 | Clancy et al. | |
| 8,503,991 | B2 | 8/2013 | Swift et al. | |
| 8,571,061 | B2 * | 10/2013 | Zilbershtein et al. | ......... 370/466 |
| 8,606,954 | B1 | 12/2013 | Abidogun et al. | |
| 8,688,817 | B2 * | 4/2014 | Hartrick et al. | ............... 709/223 |
| 2006/0095554 | A1 * | 5/2006 | Kuhles et al. | ................ 709/223 |
| 2007/0208715 | A1 | 9/2007 | Muehlbauer | |
| 2007/0208763 | A1 | 9/2007 | Muehlbauer | |
| 2007/0217648 | A1 | 9/2007 | Muehlbauer | |
| 2007/0220592 | A1 | 9/2007 | Muehlbauer | |
| 2007/0234398 | A1 | 10/2007 | Muehlbauer | |
| 2008/0242290 | A1 * | 10/2008 | Bhatia et al. | ............... 455/422.1 |
| 2009/0305680 | A1 | 12/2009 | Swift et al. | |
| 2010/0273475 | A1 | 10/2010 | Lee et al. | |
| 2011/0169913 | A1 | 7/2011 | Karaoguz et al. | |
| 2012/0131622 | A1 * | 5/2012 | McDysan et al. | ............... 725/95 |

(Continued)

*Primary Examiner* — Moustafa M Meky
(74) *Attorney, Agent, or Firm* — Meyertons, Hood, Kivlin, Kowert & Goetzel, P.C.

(57) ABSTRACT

Systems and associated methods for providing a plurality of devices the same media content. A plurality of requests for media content may be received where each of the plurality of requests is received from a respective device. It may be determined whether the plurality of requests for media content are for the same media content. In response to determining that the plurality of requests are for the same media content, a single request for the media content may be generated. The request may be provided to a server via a wide area network. The media content may be received in response to the single request and the media content may be stored in a memory medium. The media content may be provided to each of the respective devices in response to the plurality of requests.

21 Claims, 6 Drawing Sheets

(56) References Cited

U.S. PATENT DOCUMENTS

2012/0140750 A1* 6/2012 Yan et al. ................. 370/338
2013/0287091 A1 10/2013 Shaw et al.
2013/0347037 A1 12/2013 Soroushian
2014/0047376 A1 2/2014 Hood
2014/0095592 A1* 4/2014 Hartrick et al. ............. 709/203

* cited by examiner

STREAMING COMMON MEDIA CONTENT TO MULTIPLE DEVICES

PRIORITY CLAIM

The present application is a continuation-in-part of co-pending application Ser. No. 13/563,215 titled "Streaming Common Media Content to Multiple Devices" and filed on Jul. 31, 2012, whose inventors are Swapnil R. Dave and Devrim Varoglu, and which is hereby incorporated by reference in its entirety as though fully and completely set forth herein.

FIELD

The subject matter described herein relates generally to wireless and wired access points, and more particularly to improved performance of streaming media to multiple devices.

DESCRIPTION OF THE RELATED ART

On certain devices, such as laptop computers, desktop computers, tablets (e.g., iPad™, Android™-based tablets), video players, mobile gaming devices (e.g., Nintendo DS™, PlayStation Portable™, Gameboy Advance™, iPod™), various mobile devices (e.g., iPhone™, Android™-based phones), and certain television receivers (e.g., Apple TV™, Roku™) it is possible to view an event, a seminar, or a game, or attend a conference remotely. Media content streaming via "WiFi Streaming" or other analogous media content streaming allows multiple end users to view the same content using a variety of device platforms while remaining in different locations.

In certain instances, however, multiple devices may be streaming the same content from a single access point. For example, a concert or a sporting event, or even a live corporate event, may be streamed over the Internet and multiple end users may attempt to access the streaming content from the same access point. In such instances, the end users often experience a degradation in the quality of the streaming content because buffering speeds are reduced. The buffering speeds are reduced due to the access point sending multiple requests for the streaming content in response to the multiple requests to the access point for the same streaming content. When the buffering speeds are reduced, the end user experiences a lag that leads to the degradation in the quality of the streaming content and can result in interruptions or delays in the delivery of the streaming content.

SUMMARY

The features described herein relate to systems and associated methods for streaming common media content to multiple devices. A plurality of requests for media content may be received by a device, such as an access point, where each of the plurality of requests is received from a respective device. In some instances, the media content may include streaming media content. The device may determine whether the plurality of requests for media content are for the same media content. In certain instances, determining whether the plurality of requests for streaming media content are for the same media content may include determining that an IP address in each of the plurality of requests is the same. In certain instances, to determine if the requests are for the same media content, parameters of the requests, such as the IP address of the destination, the domain name system (DNS) mapping, or whether the requests are secure or unsecure may be mapped and compared.

For example, when a first request is received one or more of these parameters is stored in a data structure, such as a table. As other media content requests arrive, parameters from these other requests are extracted and stored in the data structure (or respective newly created data structures) and compared with various ones of the prior requests. In this manner, it may be determined whether a plurality of received requests are for the same media content.

As one example, determining whether the plurality of requests for media content are for the same media content may include determining that a destination IP address in each of the plurality of requests is to a server hosting the media content. For example, the destination IP address of a first request may be stored in a data structure, such as a table. As other media content requests arrive, the destination addresses of these requests may be stored and compared with the IP address(es) previously stored in the data structure. If a subset (or all) of these destination IP addresses are determined to be to a common server hosting the requested media content, then this subset (or all) of the requests are determined to be for the same media content. In this manner, it may be determined whether a plurality of received requests are for the same media content.

In response to determining that the plurality of requests are for the same media content, a single request for the media content may be generated and may be provided to the destination server via a wide area network. The media content may be received in response to the single request to the server and the media content may be stored in a memory medium. The streaming media content may then be provided to each of the respective devices in response to the plurality of requests.

The method may further include creating a plurality of local copies of the media content for each of the plurality of requests. Accordingly, providing the media content to each of the respective devices may include providing the media content from a respective one of the local copies of the media content to each respective device.

Additionally, the method described above may be performed by an access point. The access point may include processor(s) which may execute program instructions for the access point. The processor(s) may also be coupled to a memory medium. The processor of the access point may be configured to implement part or all of the methods described herein, e.g., by executing program instructions stored on a memory medium. The access point may include at least one network port. The network port may be configured to couple to a wide area network and provide a plurality of devices with access to the wide area network. The network port may be a wired network port or alternatively may include an antenna for wireless access to the wide area network. The access point may include at least one antenna that may be configured to operate as a wireless local area network transceiver and may be further configured to communicate with a plurality of devices. Additionally, the wireless local area network transceiver may be further configured to receive a plurality of requests for media content where each of the plurality of requests may be received from a respective device.

In some instances, a user equipment (UE) device, such as a smart phone, tablet, or laptop, may communicate in a wireless manner with a wide area network. The UE device may communicate with a plurality of other UE devices that are in a local area network with the UE device. The local area network may include, but is not limited to, a WiFi local area network, a WiFi Direct local area network, or a Bluetooth local area network. The UE device may be further configured to operate as a personal access point (or "personal hotspot") for the plurality of other UE devices.

The UE device may perform the method described above. For example, when the UE is operating as a personal access point, a plurality of requests for media content may be received by the UE device where each of the plurality of requests is received from a respective UE device. The UE device may determine whether the plurality of requests for media content are for the same media content, e.g., using the methods described above. For example, determining whether the plurality of requests for media content are for the same media content may include determining that an IP address in each of the plurality of requests is the same, e.g., may involve determining that a destination IP address in each of the plurality of requests is to a server hosting the media content. In response to determining that the plurality of requests are for the same media content, the UE device may generate a single request for the media content. The request may be provided to a server via the wide area network. The UE device may receive the media content in response to the single request and the media content may be stored in a memory medium of the UE device. The UE device may provide the media content to each of the respective UE devices in response to the plurality of requests.

In some instances, the method may further include the UE creating a plurality of local copies of the media content for each of the plurality of requests where providing the media content to each of the respective UE devices may include providing the media content from a respective one of the local copies of the media content to each respective UE device.

The UE device may include a processor(s) which may execute program instructions for the UE device. The processor(s) may also be coupled to a memory medium and/or to other circuits or devices, such as antennas. The processor(s) of the UE device may be configured to implement part or all of the methods described herein, e.g., by executing program instructions stored on a memory medium. The UE device may include at least one antenna for performing wireless communication with base stations.

BRIEF DESCRIPTION OF THE DRAWINGS

A better understanding of the present subject matter can be obtained when the following detailed description is considered in conjunction with the following drawings, in which.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present patent application.

RAT: Radio Access Technology

UE: User Equipment

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Access Point—the term "Wireless Access Point" has the full breadth of its ordinary meaning, and at least refers to a device that communicates in a wireless fashion with one or more UE devices and which allows these UE devices to connect to a wide area network, such as the Internet. The wireless access point may communicate with the wide area network via either a wireless connection or a wired connection. Also, the wireless access point may serve as an intermediary and connect with the wide area network via another access point. The wireless access point may communicate wirelessly with a base station using any of various cellular standards. Includes both public and private hotspots. Additionally, the wireless access point may be implemented in various manners, including, but not limited to, a computer system or a programmable hardware element(s) (e.g., an FPGA), or some combination thereof.

Access Point—refers to a device that allows other devices, such as UE devices to connect to a wide area network. The communication between the access point and the devices using it may be wireless (in this case the Access Point is a Wireless Access Point) or may be wired. Similarly, the access point may communicate with the wide area network via either a wireless connection or a wired connection. The access point may serve as an intermediary and connect with the wide area network via another access point. The access point may communicate wirelessly with a base station using any of various cellular standards. The term "Access Point" includes both public and private hotspots. Additionally, the access point may be implemented in various manners, including, but not limited to, a computer system or a programmable hardware element(s) (e.g., an FPGA), or some combination thereof.

WiFi—this term has the full extent of its ordinary meaning and at least includes a type of wireless local area network technologies defined by the IEEE 802.11 group of standards. Includes standards for 802.11a, 802.11ac, 802.11ad, 802.11af, 802.11b, 802.11g, and 802.11n, among others.

WiFi Direct—this term has the full extent of its ordinary meaning and at least includes a local area network in which devices, such as UE devices, can communicate directly with one another without the use of an access point, including peer to peer connections and connections between a group of devices. Additionally, in connections between a group of devices, one of the devices may serve as a local access point for the other devices in the group.

Femtocell—this term has the full extent of its ordinary meaning and at least includes a small, low-power cellular base station that connects to a service provider's network via a wide area network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
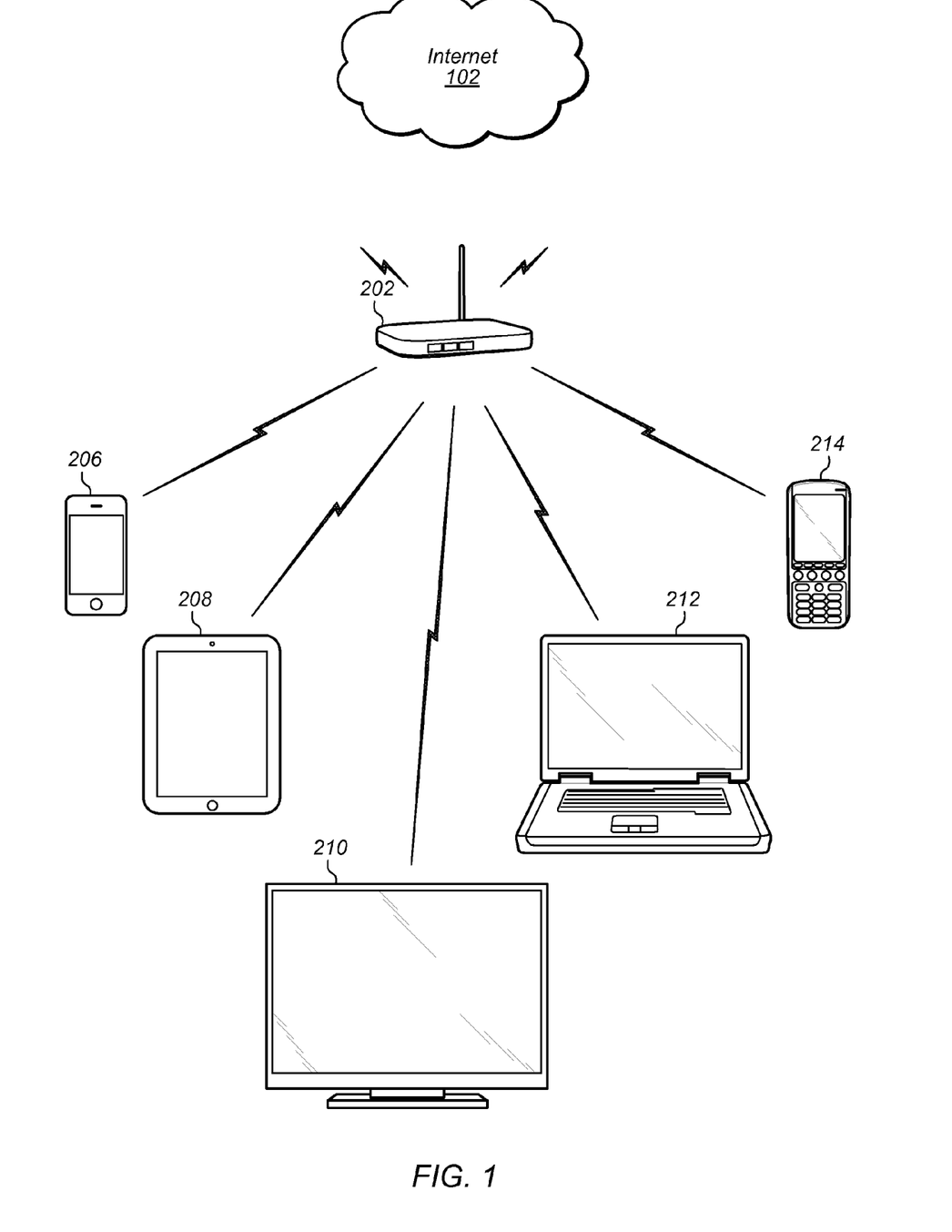
FIG. 1 illustrates an exemplary diagram of an access point communicating with various UE devices, according to one embodiment.

FIG. 1—Exemplary Communication System

FIG. 1 illustrates an exemplary communication system. It is noted that the system of FIG. 1 is merely one example of a possible system, and features described herein may be implemented in any of various systems, as desired. Access point 202 may communicate with a wide area network 102, such as the Internet. As shown, the communication with the wide area network 102 may be via a wired connection. Alternatively, the access point may communicate with the WAN 102 using wireless means via any of various standards. For example, the communication may be wireless using various WiFi standards or cellular standards. Additionally, the access point 202 may communicate via the wide area network 102 with various servers, such as servers 110 and 112. Servers 110 and 112 may host/store media content. In other instances, the access point 202 may be an intermediary access point and may communicate with another access point to communicate with the wide area network. In some instances, the communication with the wide area network may be via a wired connection. Additionally, the access point 202 may be configured to communicate with a plurality of devices. The plurality of devices may include UE devices, such as smart phone 206, tablet 208, laptop 212, and mobile phone 214. Additionally, the access point 202 may be configured to communicate with other devices, such as smart television 210.

Figure 2:
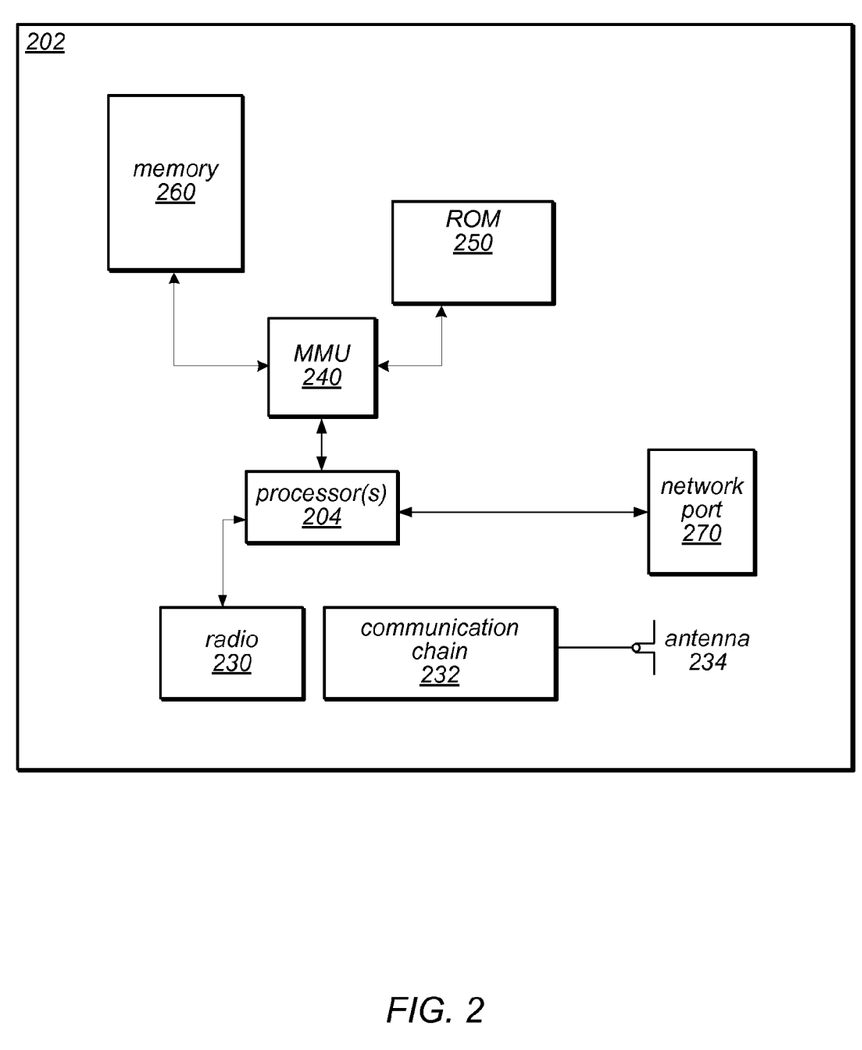
FIG. 2 illustrates an exemplary block diagram of an access point, according to one embodiment.

FIG. 2—Access Point

FIG. 2 illustrates an exemplary block diagram of an access point 202. It is noted that the access point of FIG. 2 is merely one example of a possible access point, and features described herein may be implemented in any of various devices, such as UE devices, femtocell devices, programmable hardware elements, and various other computer systems as desired. As shown, the access point 202 may include processor(s) 204 which may execute program instructions for the access point 202. The processor(s) 204 may also be coupled to memory management unit (MMU) 240, which may be configured to receive addresses from the processor(s) 202 and translate those addresses to locations in memory (e.g., memory 260 and read only memory (ROM) 250) or to other circuits or devices. In some instances, the MMU 240 may be included as a portion of the processor(s) 204.

The access point 202 may include at least one network port 270. The network port 270 may be configured to couple to a wide area network and provide a plurality of devices, such as device 210 and UE devices 206, 208, 212, and 214 access to the internet 102 as described above in FIG. 1. The network port 270 may include an antenna and other associated circuitry for wireless access to the wide area network. Alternatively, the network port 270 may be a wired network port.

The access point 202 may include at least one antenna 234. The at least one antenna 234 may be configured to operate as a wireless local area network transceiver and may be further configured to communicate with a plurality of devices such as 210 or UE devices 206, 208, 212, and 214 via radio 230. The antenna 234 communicates with the radio 230 via communication chain 232. Communication chain 232 may be a receive chain, a transmit chain or both. The term "receive chain" may refer to a processing path for the received signal and the term "transmit chain" may refer to a processing path for a transmitted signal. The radio 230 may be configured to communicate via various standards, including, but not limited to, WiFi, WiFi Direct, and Bluetooth. The wireless local area network transceiver 234 may be further configured to receive a plurality of requests for media content where each of the plurality of requests may be received from a respective device, such as those described above in FIG. 1.

The processor 204 of the access point 202 may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit).

For example, when the wireless area network transceiver receives a plurality of requests for media content from each of a plurality of respective devices, the processor 204 may be configured to determine if the plurality of requests for media content are for the same media content. In response to determining that the plurality of requests are for the same media content, the processor 204 may generate a single request for the media content to a server via the wide area network. When the media content in response to the single request is received from the server, the processor 204 may store the received media content in the memory medium of the access point 202. The processor 204 via radio 230 may then provide the media content to each of the respective devices in response to the plurality of requests. In some instances, the processor 204 may provide the received media content based on individual requests. In other instances, the processor 204 may provide the received media content based on the time of the request. In yet other instances, the processor 204 may proceed from device to device and continue to provide the media content until an acknowledgement from each requesting device is received.

Additionally, the processor 204 may be configured to determine that an IP address in each of the plurality of requests is the same to determine if the plurality of requests for media content are for the same media content. To determine if the requests are for the same media content, the processor 204 may be configured to map and compare the parameters of the requests, such as the IP address of the destination, the domain name system (DNS) mapping, whether the requests are secure or unsecure, and so forth. For example, when a first request is received by the access point 202, one or more of these parameters may be stored in a data structure, such as a table. As other media content requests arrive at the access point 202, parameters from these other requests may be extracted and stored in the data structure (or respective newly created data structures) and may be compared with various ones of the prior requests. In this manner, the processor 204 may determine whether a plurality of received requests are for the same media content.

In some instances, to determine if the requests are for the same media content, the processor 204 may determine whether the requests are to a server hosting the media content. For example, the IP address of the server hosting the media content may be stored in a data structure, such as a table. As other media content requests arrive, the IP address of a server hosting the requested media content may be stored and compared with the IP addresses previously stored in the data structure. In this manner, the processor 204 may determine whether a plurality of received requests are for the same media content.

In some instances, the processor 204 may be configured to determine that a request received later in time from a first request is for the same media content. In such instances, the processor 204 may then combine the requests into a single request and begin to provide the media content based on a single request to the server via the wide area network. Additionally, the processor 204 may be further configured to periodically check new requests to determine if requests for the same media content are being received.

The processor 204 may be further configured to create a plurality of local copies of the media content for each of the plurality of requests. The processor 204 may then provide to each respective device the media content from one of the respective local copies of the media content.

Figure 3:
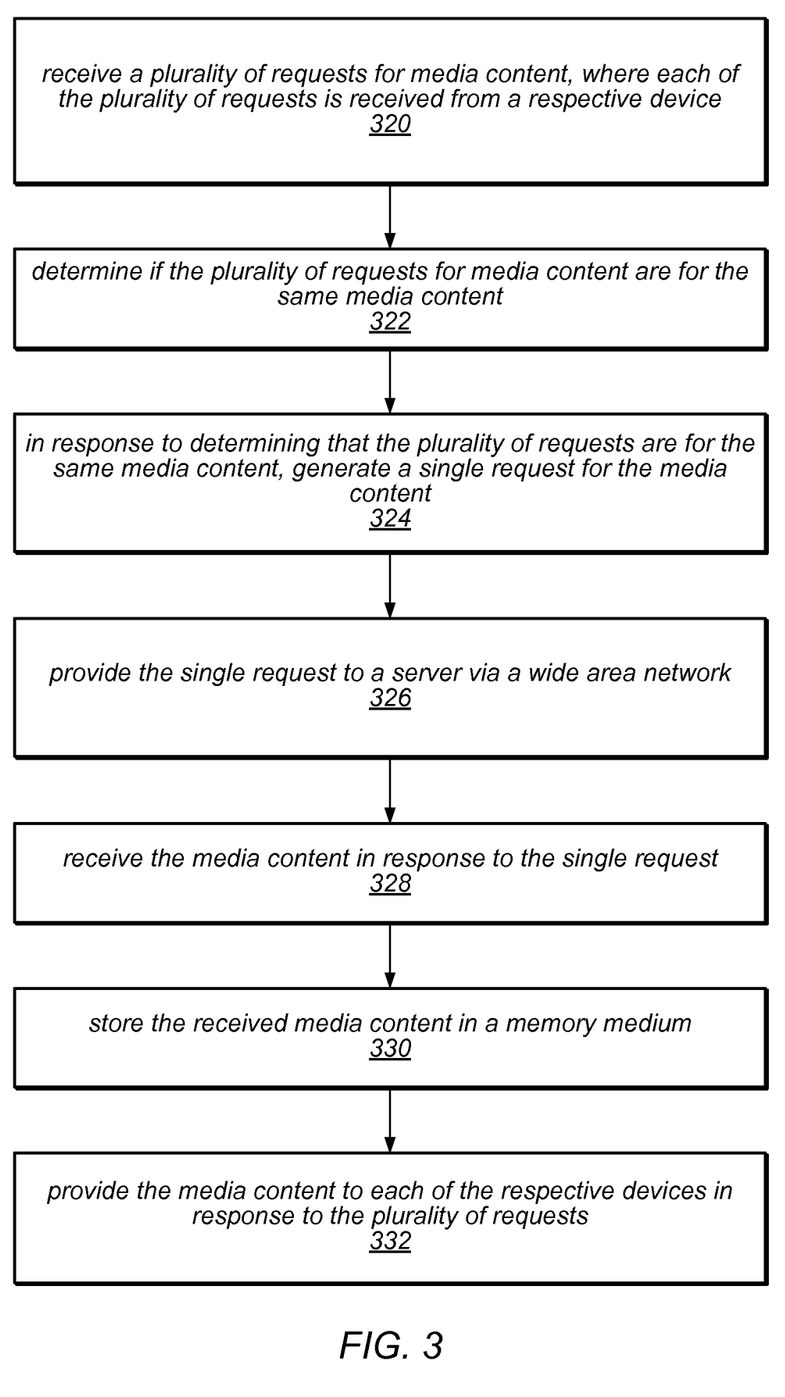
FIG. 3 is a flowchart of a method for streaming common media content to multiple UE devices, according to one embodiment.

FIG. 3—Flowchart Diagram: Access Point

FIG. 3 is a flowchart illustrating performance of a method. The method shown in FIG. 3 may be performed by the access point 202, among other devices. Some of the method elements shown may be performed concurrently, in a different order than shown, or may be omitted. Note also that additional method elements may also be performed as desired.

In 320, a plurality of requests for media content may be received by a device, such as access point 202, where each of the plurality of requests is received from a respective device, such as the devices described above in FIG. 1. The media content may be streamed from the wide area network 102 via "WiFi Streaming" or other transmission or streaming methods. Additionally, the media content may be streaming media content, such as a seminar or conference, or the streaming media content may be a variety of other content such as a sporting event or a music concert.

In 322, the access point 202 may determine whether the plurality of requests for media content are for the same media content. In certain instances, determining whether the plurality of requests for media content are for the same media content may include determining that the IP address in each of the plurality of requests is the same. To determine if the requests are for the same media content, parameters of the requests, such as the IP address of the destination, the domain name system (DNS) mapping, whether the requests are secure or unsecure, and so forth may be mapped and compared. For example, when a first request is received by the access point 202, one or more of these parameters may be stored in a data structure, such as a table. As other media content requests arrive at the access point 202, parameters from these other requests may be extracted and stored in the data structure (or respective newly created data structures) and may be compared with various ones of the prior requests. In this manner, it may be determined whether a plurality of received requests are for the same media content.

In some instances, to determine if the requests are for the same media content, it may be determined whether the requests are to a server hosting the media content. For example, the IP address of the server hosting the media content may be stored in a data structure, such as a table. As other media content requests arrive, the IP address of a server hosting the requested media content may be stored and compared with the IP addresses previously stored in the data structure. In this manner, it may be determined whether a plurality of received requests are for the same media content.

In some instances, the access point 202 may determine that a request received later in time from a first request is for the same media content. In such instances, the access point 202 may then combine the requests into a single request and begin to provide the media content based on a single request to the server via the wide area network. Additionally, the access point 202 may periodically check new requests to determine if requests for the same media content are being received.

In 324, in response to determining that the plurality of requests are for the same media content, the access point 202 may generate a single request for the media content.

In 326, the access point 202 may provide the single request for the media content to a server via a wide area network, such as Internet 102.

In 328, the media content may be received by the access point 202 from the wide area network 102 in response to the single request.

In 330, the media content may be stored in a memory medium, such as memory 260 of access point 202.

In 332, the access point 202 may provide the media content to each of the respective devices in response to the plurality of requests.

In some instances, the method may further include the access point 202 creating a plurality of local copies of the media content for each of the plurality of requests. In such an instance, providing the media content to each of the respective devices may include providing the media content from a respective one of the local copies of the media content to each respective device.

In other instances, the method may further include the access point 202 providing the received media content based on individual requests. Alternatively, the processor may provide the received media content based on the time of the request. In yet other instances, the processor may proceed from device to device and continue to provide the media content until an acknowledgement from each requesting device is received.

Figure 4:
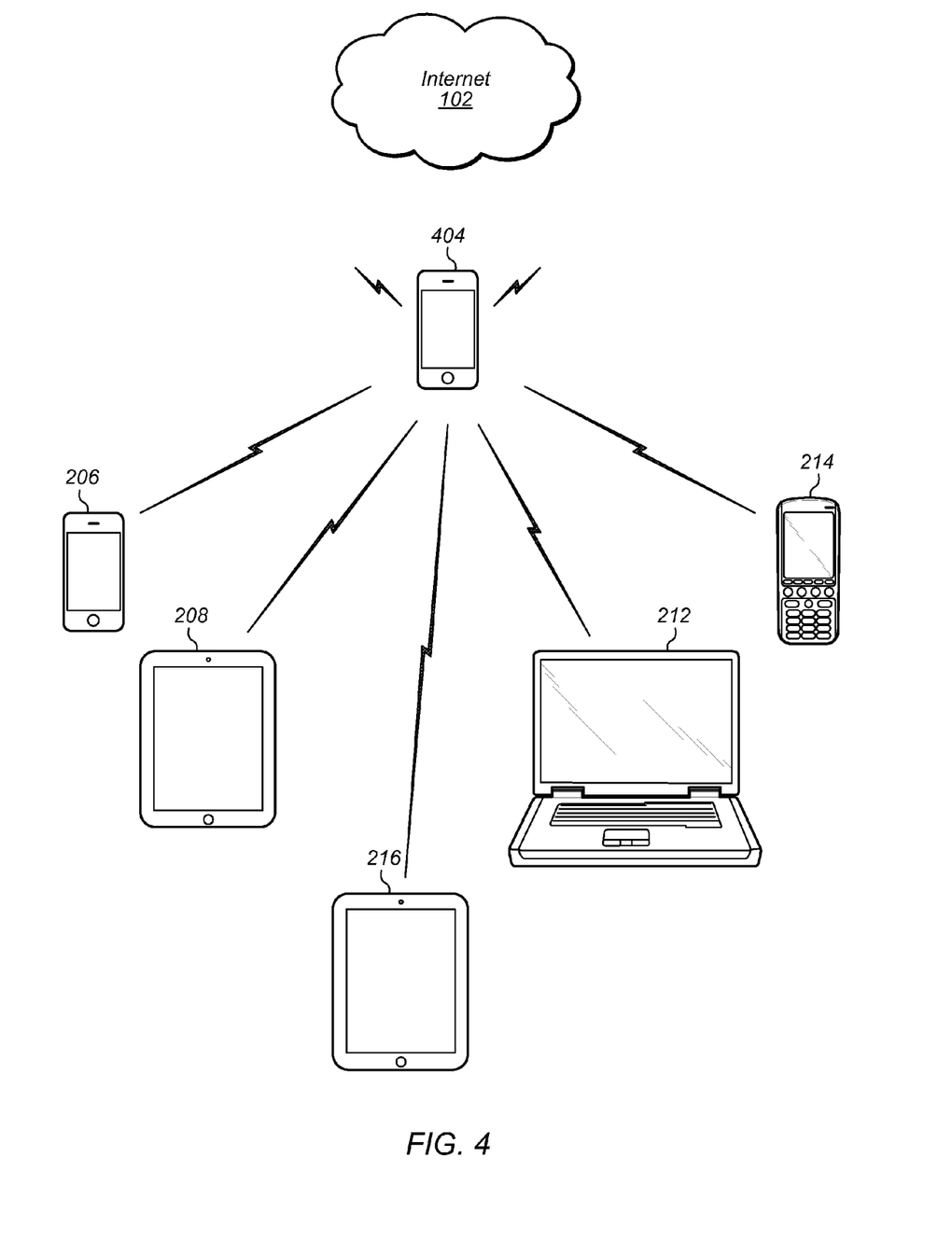
FIG. 4 illustrates an exemplary diagram of a UE device operating as a personal wireless hotspot for a plurality of UE devices, according to one embodiment.

FIG. 4—Exemplary Communication System

FIG. 4 illustrates an exemplary communication system. It is noted that the system of FIG. 4 is merely one example of a possible system, and features may be implemented in any of various systems, as desired. The UE device 404 may communicate wirelessly with a wide area network 102, such as the Internet. As shown, the communication may be wireless via any of various cellular standards. Alternatively, the communication may be wireless using various WiFi standards. Additionally, the UE device 404 may communicate via the wide are network 102 with various servers, such as servers 110 and 112. Servers 110 and 112 may host/store media content. In other instances, the UE device 404 may be an intermediary access point and may communicate with another access point to communicate with the wide area network. Additionally, the UE device 404 may be configured to communicate with a plurality of devices. The plurality of devices may include UE devices, such as smart phone 206, tablet 208, laptop 212, cellular phone 214, and tablet 216. Thus, UE device 404 may be configured to operate as a personal access point for other UE devices. More specifically, the UE device 404 may be configured to receive wireless communications from respective ones of the various devices 206-214 and provide these communications over the wide area network 102 to one or more of the servers 110 and 112. Also, the UE device 404 may be configured to receive communications from one or more of the servers 110 and 112 via the wide area network 102 and provide these communications to respective ones of the various devices 206-214.

Figure 5:
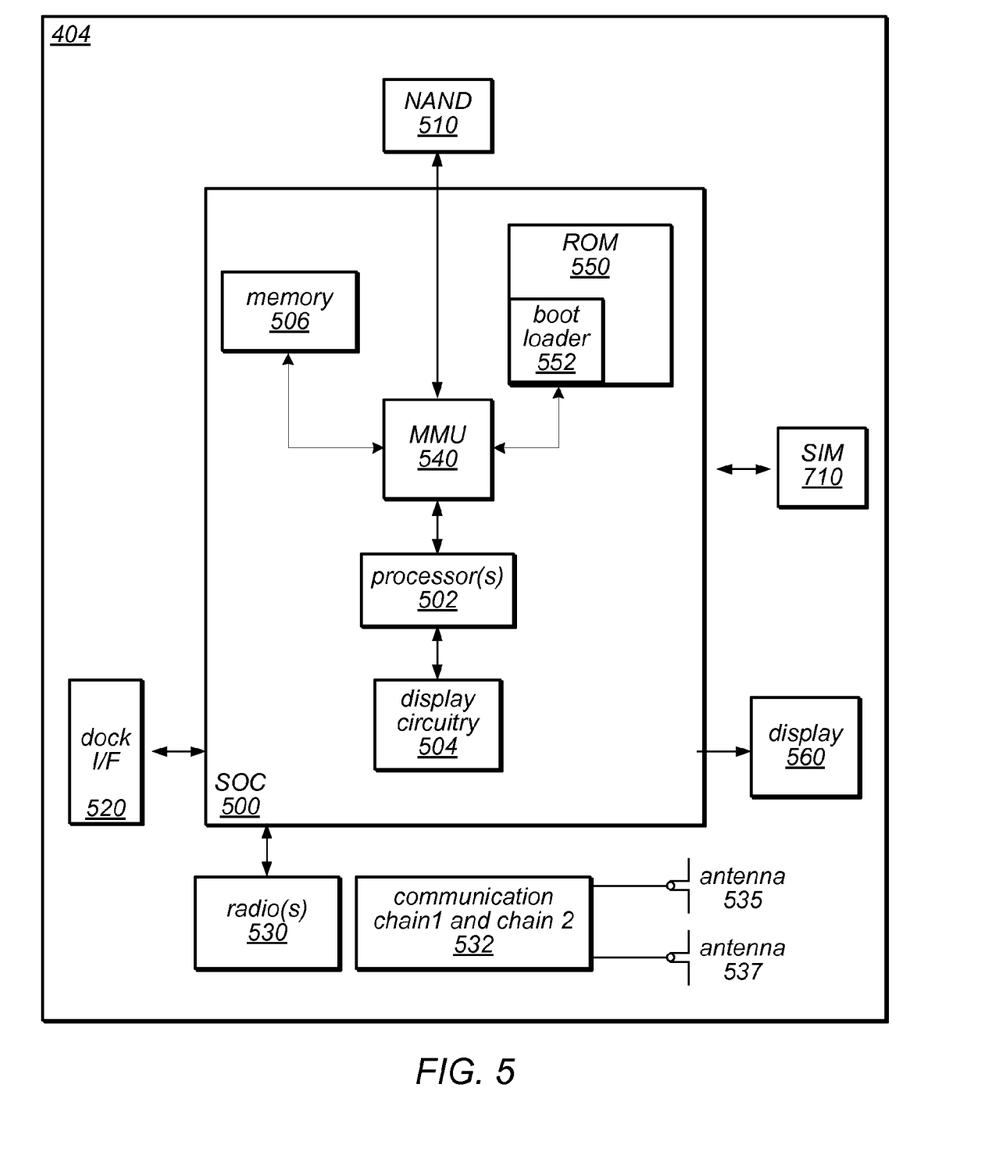
FIG. 5 illustrates an exemplary block diagram of a wireless UE device, according to one embodiment.

FIG. 5—UE Device

FIG. 5 illustrates an exemplary block diagram of UE device 404. It is noted that the UE device of FIG. 5 is merely one example of a possible UE device, and features described herein may be implemented in any of various UE devices, as desired.

As shown, the UE device 404 may include a system on chip (SOC) 500, which may include portions for various purposes. For example, as shown, the SOC 500 may include processor(s) 502 which may execute program instructions for the UE device 404 and display circuitry 504 which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, radio(s) 530, antennas 535 and 537, connector I/F 520, and/or display 560. In some instances, the MMU 540 may be included as a portion of the processor(s) 502.

As shown, ROM 550 may include a bootloader 552, which may be executed by the processor(s) 502 during boot up or initialization. As also shown, the SOC 500 may be coupled to various other circuits of the UE device 404. For example, the UE device 404 may include various types of memory (e.g., including NAND flash 510), a connector interface 520 (e.g., for coupling to a computer system), the display 560, and wireless communication circuitry (e.g., for LTE, CDMA2000, Bluetooth, WiFi, WiFi Direct, etc.), such as radio(s) 530.

The UE device 404 may include at least one antenna, or multiple antennas, for performing wireless communication with base stations. For example, the UE device 404 may use antennas 535 and 537 to perform the wireless communication. The antennas 535 and 537 communicate with the radio(s) 530 via communication chain 1 and chain 2 532. Communication chain 1 and chain 2 532 may be receive chains, transmit chains or both. The term "receive chain" may refer to a processing path for the received signal and the term "transmit chain" may refer to a processing path for a transmitted signal. The radio(s) 530 may be configured to communicate via various standards, including, but not limited to, LTE, CDMA2000, Bluetooth, WiFi, and WiFi Direct. In certain instances, one or more of the antennas 535 and 537 may be further configured to operate as a wireless access point for a plurality of UE devices as described above in FIG. 4. Thus, the UE device 404 may be configured to communicate with a plurality of other UE devices that are in a local area network with the UE device 404. In such instances, the local area network may include a WiFi, WiFi Direct, or Bluetooth network, among others. As shown, the UE device 404 may include a SIM (Subscriber Identity Module) 710, which may also be referred to as a smart card. The SIM 710 may take the form of a removable SIM card.

The processor 502 of the UE device 404 may be configured to implement part or all of the methods described in FIG. 6 below, e.g., by executing program instructions stored on a memory medium (e.g., a non-transitory computer-readable memory medium). In some instances, processor 502 may be configured as a programmable hardware element(s), such as an FPGA (Field Programmable Gate Array), or as an ASIC (Application Specific Integrated Circuit).

For example, when the UE device 404 receives a plurality of requests for media content from each of a plurality of respective UE devices the processor 502 may be configured to determine if the plurality of requests for media content are for the same media content. It should be noted, that in certain instances, the media content may include streaming media content. In response to determining that the plurality of requests are for the same media content, the processor 502 may generate a single request for the media content. When the media content in response to the single request is received, the processor 502 may store the received media content in the memory medium of the UE device 404. The processor 502 may then provide the media content to each of the respective devices in response to the plurality of requests.

In some instances, the processor 502 may be further configured to create a plurality of local copies of the media content for each of the plurality of requests. The processor 502 may then provide to each respective UE device the media content from one of the respective local copies of the media content.

In certain instances, the processor may provide the received media content based on individual requests. In other instances, the processor may provide the received media content based on the time of the request. In yet other instances, the processor may proceed from device to device and continue to provide the media content until an acknowledgement from each requesting device is received.

In some instances, the processor 502 may be further configured to determine that an IP address in each of the plurality of requests is the same IP address to determine if the plurality of requests for media content are for the same media content. In certain instances, to determine if the requests are for the same media content, parameters of the requests, such as the IP address of the destination (as indicated in the "Destination IP address" field in IP packet headers in the one or more packets that carry each request), the domain name system (DNS) mapping, or whether the requests are secure or unsecure may be mapped and compared. For example, when a first request is received by the UE device 404, one or more of these parameters may be stored in a data structure, such as a table. As other media content requests arrive at the UE device 404, parameters from these other requests may be extracted and stored in the data structure (or respective newly created data structures) and may be compared with various ones of the prior requests. In this manner, the processor 502 may determine whether a plurality of received requests are for the same media content.

In some instances, to determine if the requests are for the same media content, the processor 502 may determine whether the requests are to a server hosting the media content. For example, the IP address of the server hosting the media content may be stored in a data structure, such as a table. As other media content requests arrive, the IP address of a server hosting the requested media content may be stored and compared with the IP addresses previously stored in the data structure. In this manner, the processor 502 may determine whether a plurality of received requests are for the same media content.

In certain instances, the processor 502 may be configured to determine that a request received later in time from a first request is for the same media content. In such instances, the processor 502 may then combine the requests into a single request and begin to provide the media content based on a single request to the server via the wide area network. Additionally, the processor 502 may be further configured to periodically check new requests to determine if requests for the same media content are being received.

Figure 6:
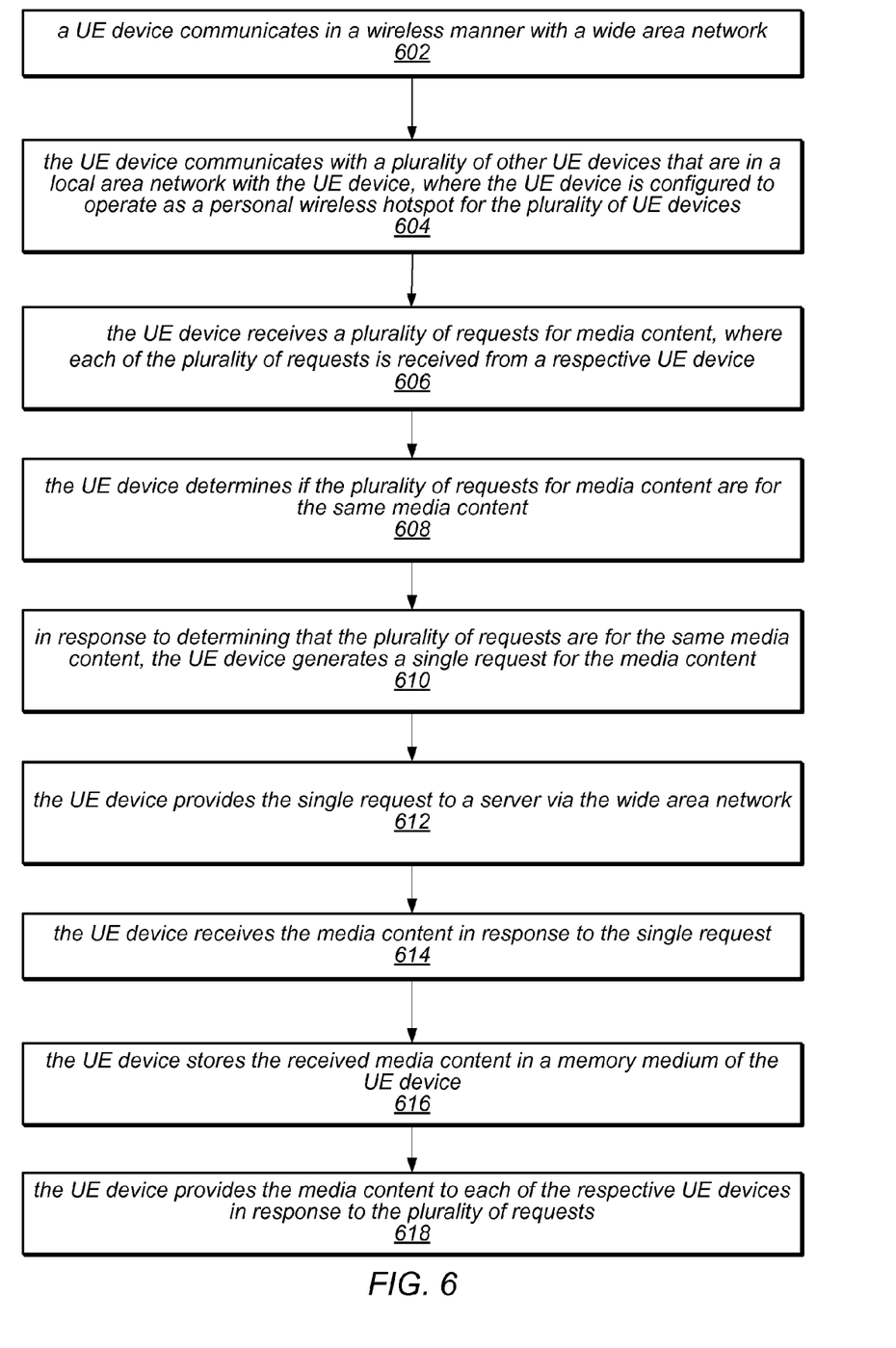
FIG. 6 is a flowchart of a method for streaming common media content to multiple UE devices using a personal wireless hotspot, according to one embodiment.

FIG. 6—Flowchart Diagram: UE Device

FIG. 6 is a flowchart illustrating operation of a UE device. The method shown in FIG. 6 may be performed by UE device 404, among other devices. In various instances, some of the method elements shown may be performed concurrently, in a different order than shown, or may be omitted. Note also that additional method elements may also be performed as desired.

In 602, UE device 404 may communicate in a wireless manner (using standards such as LTE, CDMA2000, Bluetooth, WiFi, WiFi Direct, etc.) with wide area network 102.

In 604, the UE device 404 may communicate (using standards such as Bluetooth, WiFi, WiFi Direct, etc.) with a plurality of other UE devices that are in a local area network with the UE device. The UE device may be further configured to operate as a wireless access point for the plurality of UE devices.

In 606 a plurality of requests for media content may be received by the UE device 404 in a wireless manner, e.g., via WiFi, Bluetooth, or WiFi Direct, where each of the plurality of requests is received from a respective UE device, such as the UE devices described above in FIG. 4. The media content may be streaming media content via "WiFi Streaming" or other analogous transmission or streaming formats. Additionally, the media content may be a live event such as seminar or conference, or the media content may be a variety of other content such as a sporting event or a music concert.

In 608, the UE device 404 may determine whether the plurality of requests for media content are for the same media content. In some instances, determining whether the plurality of requests for media content are for the same media content may include determining that the IP address in each of the plurality of requests is the same. To determine if the requests are for the same media content, parameters of the requests, such as the IP address of the destination, the domain name system (DNS) mapping, whether the requests are secure or unsecure, and so forth may be mapped and compared. For example, when a first request is received by the UE device 404, one or more of these parameters may be stored in a data structure, such as a table. As other media content requests arrive at the UE device 404, parameters from these other requests may be extracted and stored in the data structure (or respective newly created data structures) and may be compared with various ones of the prior requests. In this manner, it may be determined whether a plurality of received requests are for the same media content.

In some instances, to determine if the requests are for the same media content, it may be determined whether the requests are to a server hosting the media content. For example, the IP address of the server hosting the media content may be stored in a data structure, such as a table. As other media content requests arrive, the IP address of a server hosting the requested media content may be stored and compared with the IP addresses previously stored in the data structure. In this manner, it may be determined whether a plurality of received requests are for the same media content.

In some instances, the UE device 404 may determine that a request received later in time from a first request is for the same media content. In such instances, the UE device 404 may then combine the requests into a single request and begin to provide the media content based on a single request to the server via the wide area network. Additionally, the UE device 404 may periodically check new requests to determine if requests for the same media content are being received In 610, in response to determining that the plurality of requests are for the same media content, the UE device 404 may generate a single request for the media content.

In 612, the UE device may provide the request to the wide area network 102 (or to an access point coupled to the wide area network 102) for the media content.

In 614, the UE device 404 may receive the media content from the wide area network 102 in response to the single request.

In 616, the media content may be stored in a memory medium of the UE device.

In 618, the UE device 404 may provide the media content to each of the respective UE devices in response to the plurality of requests. The UE device 404 may provide the media content to the other UE devices in a wireless manner.

In some instances, the method may further include the UE device 404 creating a plurality of local copies of the media content for each of the plurality of requests. In such instances, providing the media content to each of the respective UE devices may include the UE device 404 providing the media content from a respective one of the local copies of the media content to each respective UE device.

In other instances, the method may further include the UE device 404 providing the received media content based on individual requests. Alternatively, the processor may provide the received media content based on the time of the request. In yet other instances, the processor may proceed from device to device and continue to provide the media content until an acknowledgement from each requesting device is received.

It should be noted that while specific features have been described and disclosed herein, it is intended that any feature described herein may be combined or used together with any other feature described herein as desired, and further, may be implemented via any instance of the systems disclosed herein, or variants thereof.

Although the features above have been described in considerable detail, numerous variations and modifications will become apparent to those skilled in the art once the above disclosure is fully appreciated. It is intended that the following claims be interpreted to embrace all such variations and modifications.

We claim:

1. A method, performed by a device, comprising:
   the device receiving a plurality of requests for streaming media content via a wireless local area network, wherein each of the plurality of requests is received from a respective device;
   the device determining if the plurality of requests are for the same streaming media content;
   in response to the device determining that the plurality of requests are for the same streaming media content, the device generating a single request for the streaming media content;
   the device providing the single request to a server via the Internet;
   the device receiving the streaming media content from the server via the Internet in response to the single request;
   the device storing the received streaming media content in a memory medium in the device;
   the device creating a plurality of local copies of the streaming media content;
   the device providing, responsive to the plurality of requests, the streaming media content to each of the respective devices via the wireless local area network, wherein the providing the streaming media content comprises, for each respective device, transmitting the streaming media content based on a respective one of the local copies of the streaming media content;
   the device receiving at least one additional request for media content from at least one additional respective device subsequent to said providing the single request to the server;
   the device determining that the received at least one additional request is for the streaming media content; and
   the device providing, responsive to the at least one additional request, the streaming media content to the at least one additional respective device without transmitting an additional request for the media content to the server.

2. The method of claim 1,
   wherein the determining if the plurality of requests for streaming media content are for the same streaming media content comprises determining that a destination IP address in each of the plurality of requests is the same.

3. The method of claim 1,
   wherein the determining if the plurality of requests for streaming media content are for the same streaming media content comprises determining that a destination IP address in each of the plurality of requests is to a server hosting the streaming media content.

4. The method of claim 1,
   wherein the device is an access point.

5. The method of claim 4,
   wherein the device is a user equipment (UE) device.

6. An access point, comprising:
   a network port configured to couple to a wide area network and provide a plurality of devices access to the Internet:
   a wireless local area network (WLAN) transceiver configured to communicate with the plurality of devices;
   wherein the WLAN transceiver is configured to receive a plurality of requests for media content, wherein each of the plurality of requests is received from a respective device;
   a memory medium; and
   a processor coupled to the memory medium, the network port and the WLAN transceiver, wherein the processor is configured to:
      determine if the plurality of requests are for the same media content; and
      in response to determining that the plurality of requests are for the same media content, generate a single request for the media content;
   wherein the network port is configured to:
      provide the single request to a server via the wide area network; and
      receive the media content from the server in response to the single request;
   wherein the processor is configured to store the received media content in the memory medium and create a plurality of local copies of the received media content;
   wherein the WLAN transceiver is configured to provide the received media content to each of the respective devices, wherein to provide the receive media content the WLAN transceiver is configured to provide the received media content from a respective one of the local copies of the received media content;
   wherein the WLAN transceiver is further configured to receive at least one additional request for media content from at least one additional respective device subsequent to the network port providing the single request to the server;
   wherein the processor is further configured to determine that the received at least one additional request is for the media content; and
   wherein the WLAN transceiver is further configured to provide, responsive to the at least one additional request, the media content to the at least one additional respective device without the network port transmitting an additional request for the media content to the server.

7. The access point of claim 6,
wherein the network port comprises an antenna for wireless access to the wide area network.

8. The access point of claim 6,
wherein the network port is a wired networking port.

9. The access point of claim 6,
wherein the processor is further configured to determine that an IP address in each of the plurality of requests is the same to determine if the plurality of requests for media content are for the same media content.

10. The access point of claim 6,
wherein the processor is further configured to determine that an IP address in each of the plurality of requests is to a server hosting the media content to determine if the plurality of requests for media content are for the same media content.

11. The access point of claim 6,
wherein the media content comprises streaming media content.

12. A method, comprising:
a user equipment (UE) device communicating in a wireless manner with a wide area network;
the UE device communicating with a plurality of other UE devices that are in a local area network with the UE device; wherein the UE device is configured to operate as a wireless access point for the plurality of UE devices;
the UE device receiving a plurality of requests for media content, wherein each of the plurality of requests is received from a respective UE device;
the UE device determining if the plurality of requests are for the same media content;
in response to determining that the plurality of requests are for the same media content, the UE device generating a single request for the media content to the wide area network;
the UE device providing the single request to a server via the wide area network;
the UE device receiving the media content in response to the single request;
the UE device storing the received media content in a memory medium of the UE device;
the UE device creating a plurality of local copies of the received media content;
the UE device providing the received media content to each of the respective UE devices in response to the plurality of requests, wherein the providing the received media content comprises, for each respective UE device, providing the received media content from a respective one of the local copies of the received media content;
the UE device receiving at least one additional request for media content from at least one additional respective UE device subsequent to said providing the single request to the server;
the UE device determining that the received at least one additional request is for the media content; and
the UE device providing, responsive to the at least one additional request, the media content to the at least one additional respective device without transmitting an additional request for the media content to the server.

13. The method of claim 12,
wherein the determining if the plurality of requests for media content are for the same media content comprises determining that an IP address in each of the plurality of requests is the same.

14. The method of claim 12,
wherein the determining if the plurality of requests for media content are for the same streaming media content comprises determining that an IP address in each of the plurality of requests is to a server hosting the media content.

15. The method of claim 12,
wherein the local area network comprises at least one of:
a Bluetooth local area network;
a WiFi local area network; or
a WiFi direct local area network.

16. The method of claim 12,
wherein the media content comprises streaming media content.

17. A UE device, the UE device comprising:
an antenna for communicating in a wireless manner with a wide area network, wherein the antenna is further configured to communicate with a plurality of other UE devices that are in a local area network with the UE device, and wherein the UE device is configured to operate as a wireless access point for the plurality of UE devices;
a memory medium; and
a processor coupled to the memory medium and antenna, the processor configured to:
determine if a plurality of requests for media content from the plurality of other UE devices are for the same media content;
in response to determining that the plurality of requests are for the same media content, generate a single request for the media content;
provide the single request to a server via the wide area network;
receive the media content from the wide area network in response to the single request;
store the received media content in the memory medium of the UE device;
create a plurality of local copies of the received media content;
provide the media content to each of the respective plurality of other UE devices in response to the plurality of requests, wherein to provide the received media content, the processor is configured to, for each respective device, transmit the received media content based on a respective one of the local copies of the received media content;
receive at least one additional request for media content from at least one additional other UE device subsequent to said providing the single request to the server;
determine that the received at least one additional request is for the media content; and
provide, responsive to the at least one additional request, the media content to the at least one additional other UE device without transmitting an additional request for the media content to the server.

18. The UE device of claim 17,
wherein the processor is further configured to determine that an IP address in each of the plurality of requests is the same to determine if the plurality of requests for media content are for the same media content.

19. The UE device of claim 17,
wherein the processor is further configured to determine that an IP address in each of the plurality of requests is to a server hosting the media content to determine if the plurality of requests for media content are for the same media content.

20. The UE device of claim 17,
wherein the local area network comprises at least one of:
- a Bluetooth local area network;
- a WiFi local area network; or
- a WiFi direct local area network.

21. A method performed by at an electronic device, the method comprising:
- receiving a plurality of requests for media content via a wireless local area network, wherein each of the plurality of requests is received from a respective device;
- based on the plurality of requests, generating a single request for the media content;
- transmitting the single request for the media content to a server via a wide area network;
- receiving the media content from the server via the wide area network;
- creating a plurality of local copies of the received media content;
- transmitting the received media content to each of the respective devices via the wireless local area network, wherein the transmitting the received media content comprises, for each respective device, transmitting the received media content based on a respective one of the local copies of the streaming media content
- receiving at least one additional request for media content from at least one additional respective device subsequent to said transmitting the single request for the media content;
- determining that the received at least one additional request is for the media content; and
- providing, responsive to the at least one additional request, the media content to the at least one additional respective device without transmitting an additional request for the media content to the server.

* * * * *

UNITED STATES PATENT AND TRADEMARK OFFICE
CERTIFICATE OF CORRECTION

| | | |
|---|---|---|
| PATENT NO. | : 8,959,176 B2 | Page 1 of 1 |
| APPLICATION NO. | : 13/663606 | |
| DATED | : February 17, 2015 | |
| INVENTOR(S) | : Swapnil R. Dave et al. | |

It is certified that error appears in the above-identified patent and that said Letters Patent is hereby corrected as shown below:

On the title page

Item (63) Please delete, "Jul. 13, 2012" and substitute -- Jul. 31, 2012 --

Signed and Sealed this
Thirtieth Day of June, 2015

Michelle K. Lee
*Director of the United States Patent and Trademark Office*